Oct. 23, 1923.

W. J. TODD 1,471,929

LAWN CLEANING MACHINE

Filed Sept. 25, 1922

INVENTOR.
William Jerome Todd

Patented Oct. 23, 1923.

1,471,929

UNITED STATES PATENT OFFICE.

WILLIAM JEROME TODD, OF DENVER, COLORADO.

LAWN-CLEANING MACHINE.

Application filed September 25, 1922. Serial No. 590,395.

*To all whom it may concern:*

Be it known that I, WILLIAM JEROME TODD, a citizen of the United States, residing at Denver, in the county of Denver and State of Colorado, have invented a new and useful Lawn-Cleaning Machine, of which the following is a specification.

My invention relates to improvements in lawn cleaning machines, and consists in certain improvements therein as will be hereinafter fully described and set forth in the claims.

The primary object of my invention resides in providing a simple and practical means for removing leaves and other rubbish from lawns, and is particularly adapted for use in connection with a suitable catching basket.

Another object of my invention resides in the construction of a simple compact machine that can be easily propelled over any lawn in a similar manner to that of an ordinary lawn mower.

The above and other objects, all of which will fully appear in the following description; I attain by the mechanism illustrated in the accompanying drawing, in the various views of which similar numerals refer to similar parts, and in which—

Figures 1, 2, 3:
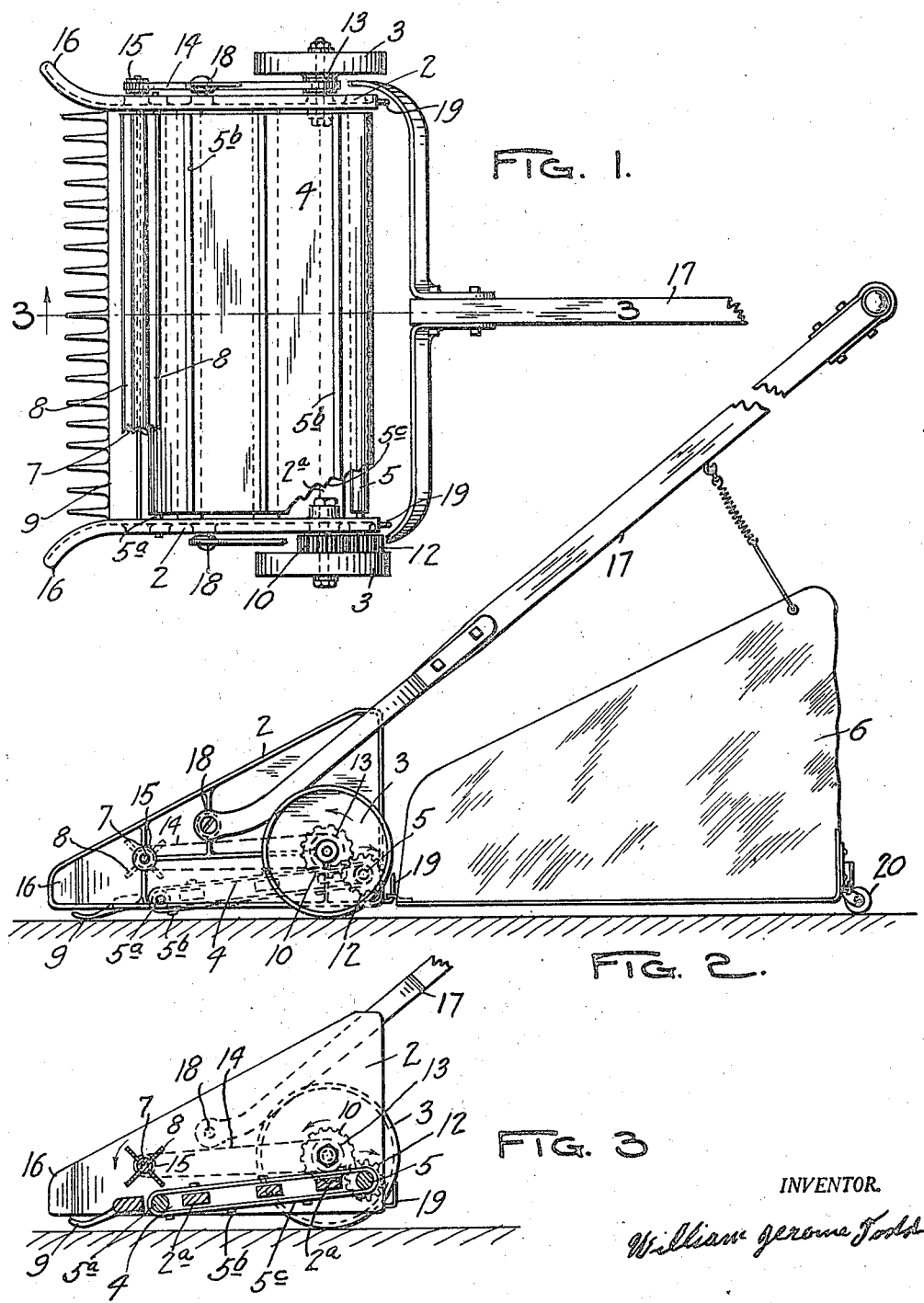
Figure 1 is a plan view of the machine, with a portion of the steering handle removed.
Figure 2 is a side elevation of the entire machine, including the catching basket.
Figure 3 is a vertical section of the machine taken along the line 3—3, Figure 1.

The side plates 2 held together in a parallel position to each other by means of cross bars 2ª constitute the frame-work of the machine, which is suitably supported on the wheels 3.

An endless belt conveyor 4 with rollers 5 and 5ª adapted to rotate in bearings provided in side plates 2 and with a belt 5ᶜ upon which slats 5ᵇ are rigidly secured, which aid in holding the leaves and rubbish on the conveyor as they are being carried to the catcher basket 6.

A scraper roller 7 provided with blades 8 extending along the length of said roller assists in carrying the rubbish from the rake 9 to the conveyor 4.

The said rake 9 is rigidly secured between the side plates 2 at the forward end of the frame. A spur gear 10 formed integral with one of the wheels 3 meshes with a pinion 12 keyed to the end of the conveyor roller 5, thus imparting a rotary motion to the conveyor in the opposite direction to the direction of travel of the machine.

A pulley 13 formed integral with the other wheel 3 is connected to the scraper roller 7 through the medium of a belt 14 and pulley 15 thus providing a means of rotation in the opposite direction to that of the conveyor, scraping the rubbish from the rake onto the conveyor.

The forward ends 16 of the side plates 2 are turned outwardly to facilitate in directing the leaves into the path of the rake 9. The machine is guided and propelled by means of a handle 17 pivotally connected to the frame 18.

The catcher basket 6 can be readily attached or detached to the hooks 19 secured to the rear end of the side plates 2—and it is supported at the other end by a caster roller 20.

The cross bars 2ª are so arranged that they provide a support to prevent the conveyor belt from sagging under the weight of its load.

In the operation, the machine is pushed forward over the lawn, and all leaves and rubbish in the path of travel is collected by the rake 9 and with the assistance of the scraper roller 7 deposited onto the conveyor 4 and carried back into the catcher basket 6.

When the basket is filled it is removed from the hooks 19 and the contents disposed of, after which it is again attached to the machine and the same operation repeated until the lawn has been cleaned.

I claim:

1. In a lawn cleaning machine comprising a frame composed of side plates with cross bars so arranged to retain said plates parallel with each other; said frame supported on wheels—an endless belt conveyor rotatably supported on said frame; a scraper roller and rake bar supported thereon, means for transmitting rotary motion to said conveyor and scraper roller, means for attaching a receptacle for catching the material from the machine, substantially as described.

2. In a lawn cleaning machine comprising a frame composed of side plates with cross bars so arranged to retain said plates parallel with each other; said frame supported on wheels—an endless belt conveyor rotatably supported on said frame; a scraper roller and rake bar supported thereon, means for transmitting rotary motion to said conveyor and scraper roller, means for attaching a receptacle for catching the material from the machine, a guiding and steering means pivotally secured to said frame, substantially as set forth.

WILLIAM JEROME TODD.